(12) United States Patent
Kim et al.

(10) Patent No.: US 7,778,126 B2
(45) Date of Patent: *Aug. 17, 2010

(54) APPARATUS AND METHOD FOR CONTROLLING A RECORDING LIGHT SIGNAL

(75) Inventors: Soo-yong Kim, Suwon-si (KR); In-ju Jang, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 830 days.

This patent is subject to a terminal disclaimer.

(21) Appl. No.: 11/517,323

(22) Filed: Sep. 8, 2006

(65) Prior Publication Data

US 2007/0058508 A1 Mar. 15, 2007

(30) Foreign Application Priority Data

Sep. 13, 2005 (KR) .................. 10-2006-0085210

(51) Int. Cl.
*G11B 5/09* (2006.01)
(52) U.S. Cl. ............... 369/47.5; 369/53.26; 369/47.53; 369/47.44
(58) Field of Classification Search ............ 369/47.53, 369/47.54, 47.55, 53.37, 53.26, 47.5
See application file for complete search history.

(56) References Cited

U.S. PATENT DOCUMENTS

| | | | | |
|---|---|---|---|---|
| 5,956,313 A | * | 9/1999 | Maegawa et al. | 369/53.26 |
| 6,359,847 B1 | * | 3/2002 | Shimizu | 369/53.26 |
| 6,671,248 B2 | * | 12/2003 | Miyabata et al. | 369/116 |
| 6,920,097 B2 | * | 7/2005 | Kim | 369/47.53 |
| 6,944,109 B2 | * | 9/2005 | Wang et al. | 369/53.26 |
| 7,085,210 B2 | * | 8/2006 | Ogawa | 369/47.53 |
| 7,551,524 B2 | * | 6/2009 | Colbum et al. | 369/13.27 |
| 2002/0021641 A1 | * | 2/2002 | Miyabata et al. | 369/53.26 |
| 2004/0052179 A1 | * | 3/2004 | Ishiyama | 369/47.53 |
| 2005/0169131 A1 | * | 8/2005 | Nakao et al. | 369/47.5 |
| 2006/0056276 A1 | * | 3/2006 | Shimano et al. | 369/112.02 |
| 2006/0176800 A1 | * | 8/2006 | Colbum et al. | 369/116 |
| 2007/0153654 A1 | * | 7/2007 | Matsuda | 369/47.44 |

FOREIGN PATENT DOCUMENTS

| | | |
|---|---|---|
| TW | 550 555 | 9/2003 |
| TW | 1 231 494 | 4/2005 |
| TW | 1 233 113 | 5/2005 |

\* cited by examiner

*Primary Examiner*—Thuy N Pardo
(74) *Attorney, Agent, or Firm*—Lee & Morse, P.C.

(57) ABSTRACT

A method and apparatus for controlling a light source for use with an optical disc having optimum power values for different stages in a writing signal for the optical disc, includes comparing current operational characteristics of the light source to previous operational characteristics, and, when the current operational characteristics differ from the previous operational characteristics and a stage in the writing signal has overlapping power, determining a compensation voltage based on the current operational characteristics and an optimum power value for that stage.

12 Claims, 6 Drawing Sheets

US 7,778,126 B2

APPARATUS AND METHOD FOR CONTROLLING A RECORDING LIGHT SIGNAL

BACKGROUND OF THE INVENTION

1. Field of the Invention

The present invention is related to an apparatus and method for controlling a recording light signal. More particularly, the present invention is related to an apparatus and method for controlling the recording light signal in accordance with changes in operational characteristics of the recording light signal.

2. Description of Related Art

Light sources used in optical recording and reproducing apparatuses, e.g., blu ray disc (BD), compact disc (CD), digital versatile disc (DVD), high definition (HD)-DVD, have operational characteristics that may change due to a number of factors, e.g., temperature, age and humidity. Only if the optical recording and reproducing apparatus has a stable light source can data on an optical disk be faithfully recorded and reproduced.

In addressing this problem, optimum power control (OPC) has been used. For OPC to be realized, disc manufacturers store suitable recording power values in lead in areas of recordable discs. An optical disc recording apparatus tests the suitable recording power values to obtain an optimum or target power when a disc is loaded in the optical disc recording apparatus.

FIG. 1 illustrates a block diagram of a conventional automatic light power controller (ALPC) 5. Here, the light source controlled by the ALPC 5 is illustrated as a laser diode (LD) 2 whose output is monitored by a detector 3. The ALPC 5 may include a reference voltage generator 51, a comparator 52, a target power operation circuit 53, an LD driver 54 and an LD output monitor.

The reference voltage generator 51 outputs a reference voltage Vr corresponding to the target power obtained by the OPC process. The LD output monitor 55 receives the output from the detector 3 and outputs a corresponding monitored voltage Vm. The comparator 52 compares the reference voltage Vr with the monitored voltage Vm and outputs the difference. The target power operation circuit 53 adds or subtracts the difference to or from the previous recording signal to compensate for the previous recording signal, and outputs the compensated signal as the write signal WS. The LD driver 54 converts the voltage values of the compensated recording signal into current values and drives the LD 2 with the compensated recording signal. Thus, the ALPC 5 automatically compensates for any changes in the output of the LD 2, and, thus, of the recording light signal or write pulse WP.

FIG. 2 illustrates waveforms used in the operation of the optical recording and reading apparatus. As shown in FIG. 2, the write signal WS includes an overdrive power, a recording power, a cooling power and a reading power. As shown in FIG. 2, the output of the optical detector 3 in response to the write signal WS is analog, and does not exactly follow the waveform of the write signal WS. As shown in FIG. 2, a sample pulse SP of the sample and hold signal of the LD output monitor 55 samples during stable record and read operations. Thus, the conventional ALPC 5 only compensates the recording and reading power, i.e., does not compensate the overdrive power and the cooling power. Even if the sampling frequency is increased, the conventional ALPC cannot obtain the exact value of the overdrive and cooling power. Thus, recording quality may be poor.

SUMMARY OF THE INVENTION

The present invention is therefore directed to a method and apparatus for controlling a recording light signal, which substantially overcome one or more of the problems due to the limitations and disadvantages of the related art.

It is therefore a feature of an embodiment of the present invention to provide a method and apparatus that readily compensates for changes in overlapping voltages, e.g., voltages corresponding to the overdrive power, the castle peak power and the cooling power, due to changes in operational characteristics of a light source.

It is therefore another feature of an embodiment of the present invention to provide a method and apparatus that automatically compensates for changes in overlapping voltages due to changes in operational characteristics of a light source.

It is therefore yet another feature of an embodiment of the present invention to provide a method and apparatus that compensates for changes in overlapping voltages due to changes in operational characteristics of a light source when the operational characteristics change by more than a predetermined amount.

At least one of the above and other features and advantages of the present invention may be realized by providing a method of controlling a light source for use with an optical disc having optimum power values for different stages in a writing signal for the optical disc, the method including comparing current operational characteristics of the light source to previous operational characteristics, and, when the current operational characteristics differ from the previous operational characteristics and a stage in the writing signal has overlapping power, determining a compensation voltage based on the current operational characteristics and an optimum power value for that stage.

Determining the compensation voltage may include determining the optimum power value for the stage based on the current operational characteristics. The current operational characteristics may be determined from characteristics detected during recording and reading stages. The stage having overlapping power may be one of an overdrive stage, a cooling stage and a castle peak stage.

When a stage has a power that can be measured, determination of a compensation voltage may be based on a comparison between a measured voltage and a reference voltage. The stage having a power that can be measured may be one of a record stage and a read stage.

The method may include determining whether the current operational characteristics differ from the previous operational characteristics by a predetermined amount and determining the compensation voltage only when a difference exceeds the predetermined amount.

At least one of the above and other features and advantages of the present invention may be realized by providing an apparatus for controlling a light source for use with an optical disc having optimum power values for different stages in a writing signal for the optical disc, the apparatus including a comparator for comparing current operational characteristics of the light source to previous operational characteristics; and a compensator for determining, when the current operational characteristics differ from the previous operational characteristics and a stage in the writing signal has overlapping power, a compensation voltage based on the current operational characteristics and an optimum power value for that stage.

The compensator may determine the optimum power value for the stage based on the current operational characteristics. The current operational characteristics may be determined from measured recording and reading voltages. The stage having overlapping power may be one of an overdrive stage, a cooling stage and a castle peak stage. The compensator may output the compensation voltage to a target power operation circuit for controlling the light source. The target power operation circuit may control the light source in accordance with the compensation voltage. The stage having a power that can be measured may be one of a record stage and a read stage.

The apparatus may include a thresholder determining whether the current operational characteristics differ from the previous operational characteristics by a predetermined amount, the compensator determining the compensation voltage only when a difference exceeds the predetermined amount.

At least one of the above and other features and advantages of the present invention may be realized by providing an apparatus for controlling a light source for use with an optical disc, including an operator receiving a write signal having different stages output to a driver for the light source, the operator for determining whether current operational characteristics of the light source differs from previous operational characteristics, whether a voltage corresponding to light output by the light source can be measured over a sample period, and outputting a compensation voltage based on the current operational characteristics when the voltage cannot be measured.

The operator may further determine whether the current operational characteristics differ from the previous operational characteristics by a predetermined amount, and output the compensation voltage only when the predetermined amount is exceeded.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
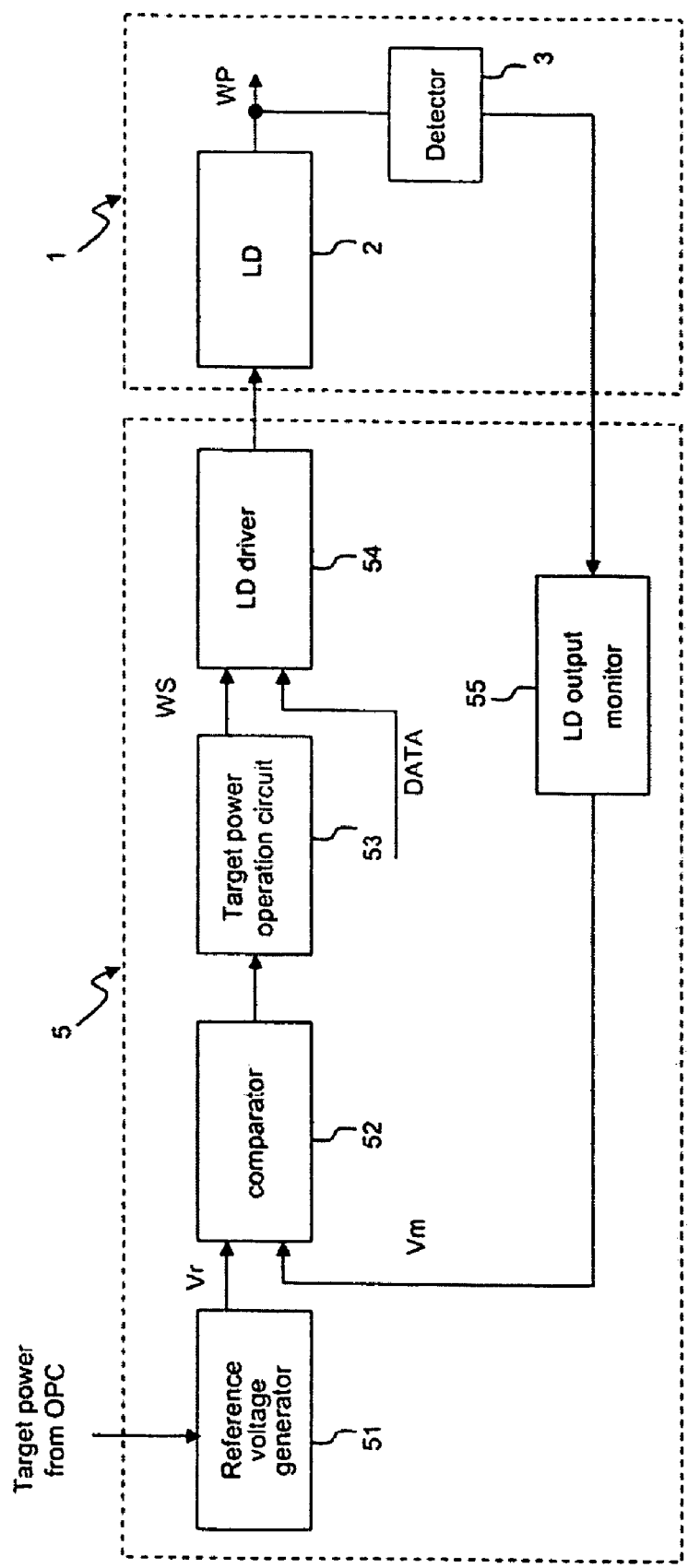
FIG. 1 illustrates a block diagram of a conventional automatic light power controller.
Figure 2:
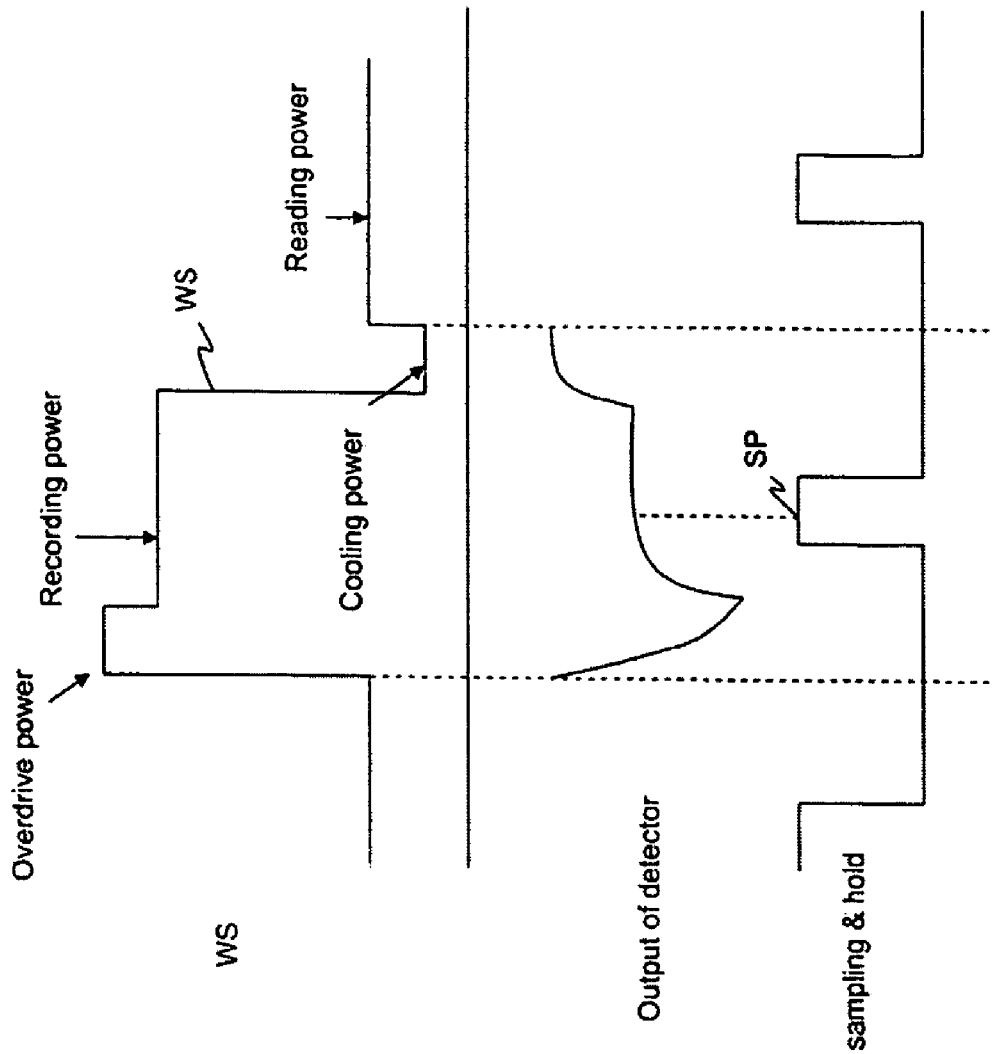
FIG. 2 illustrates waveforms used in the operation of the optical recording and reading apparatus of FIG. 1.

Korean Patent Application No. 10-2005-0085210, filed on Sep. 13, 2005, in the Korean Intellectual Property Office, and entitled: "Apparatus and Method for Controlling a Recording Light Signal," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. Like reference numerals refer to like elements throughout.

In accordance with embodiments of the present invention, the overlapping voltages, e.g., voltages corresponding to the overdrive power, the castle peak power and the cooling power, as well as the reading and recording voltages, may be adjusted for optimal operation when operational characteristics of a light source change. This adjustment may be quickly and readily performed in accordance with the relationship between overlapping powers and measured reading and writing powers, and the relationship between output power and driving voltage of the light source.

Figure 3:
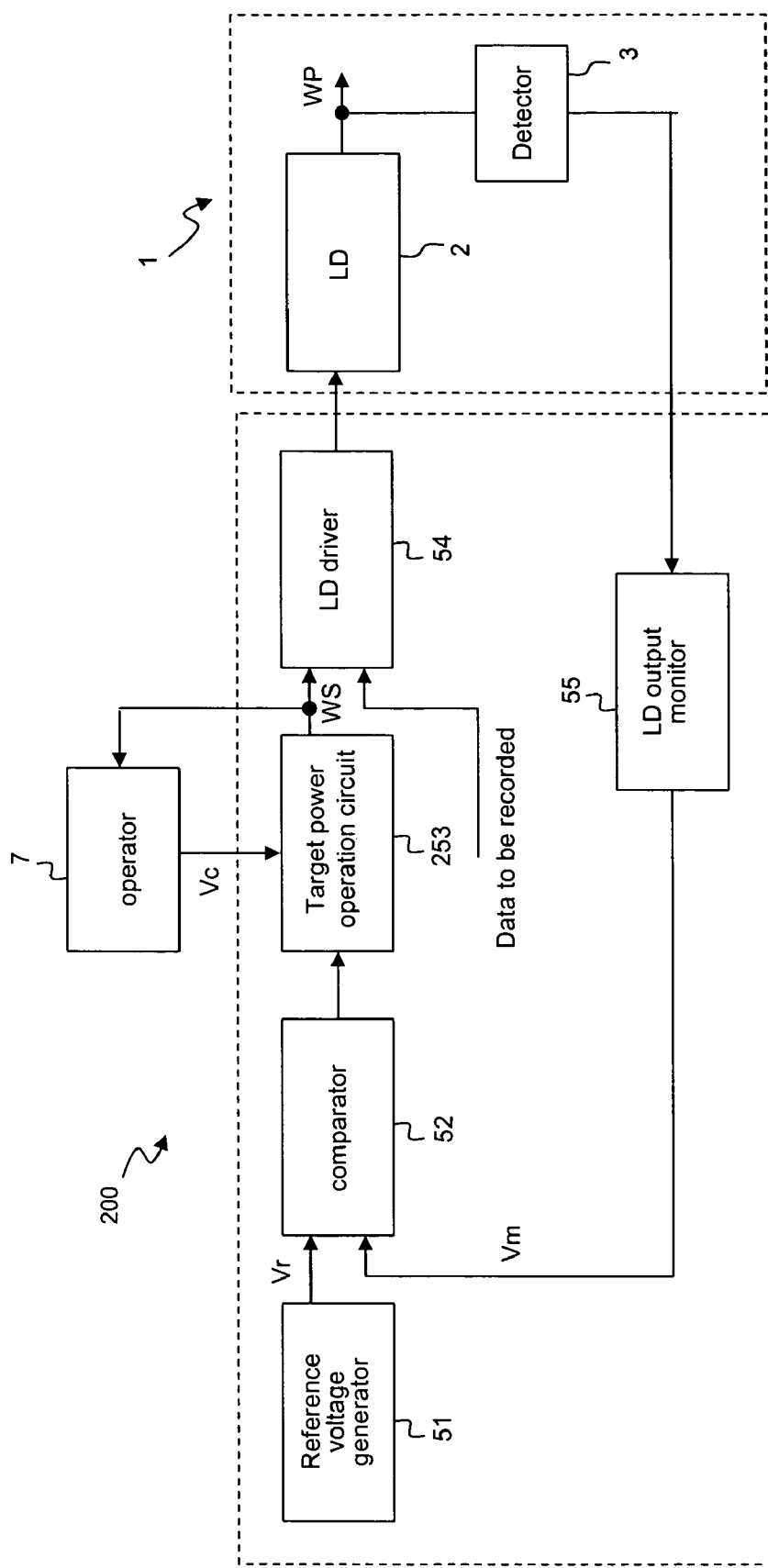
FIG. 3 illustrates a block diagram of an automatic light power controller in accordance with an embodiment of the present invention.

FIG. 3 illustrates a block diagram of an ALPC 200 according to an embodiment of the present invention. As can be seen therein, the ALPC 200 may include the reference voltage generator 51, the comparator 52, the LD drive 54 and the LD output monitor 55, operating as discussed above in relation to FIG. 1. The ALPC 200 may also include a target power operation circuit 253 that replaces the target power operation circuit 53 of the ALPC 5. The ALPC 200 also may include an operator 7 that receives the same write signal WS as the LD driver 54. The operator 7 may output a compensation signal Vc to the target power operation circuit 253. Thus, the target power operation circuit 253 receives both the output of the comparator 52 and the operator 7.

If the operational characteristics of the light source are not changed, the target power operation circuit 253 may compensate the write signal WS in accordance with the output of the comparator 52. If the operational characteristics of the light source do change, the target power operation circuit 253 may operate according to whether the magnitude of the light signal can be measured, e.g., the recording or reading power, or not, e.g., the overdrive power, the cooling power or the castle peak power.

If the magnitude can be measured, the target power operation circuit 253 may compensate the write signal WS in accordance with the output of the comparator 52. If the magnitude cannot be measured, the target power operation circuit 53 may compensate the write signal WS in accordance with the output of the operator 7.

When the magnitude of the light cannot be measured, the operator 7 may generate a compensation signal Vc. Since the recording power and reading power may be measured, their corresponding voltages may be determined. Further, since the levels of the overlapping powers, e.g., the overdrive power, the castle peak power and the cooling power, are fixed relative to the recording power and the reading power, and since the relationship between power and voltage is known, e.g., a linear relationship, for the LD 2, a compensation voltage Vc for each of the overlapping voltage may be determined from the measured recording and reading powers, as shown in FIG. 4.

Figure 4:
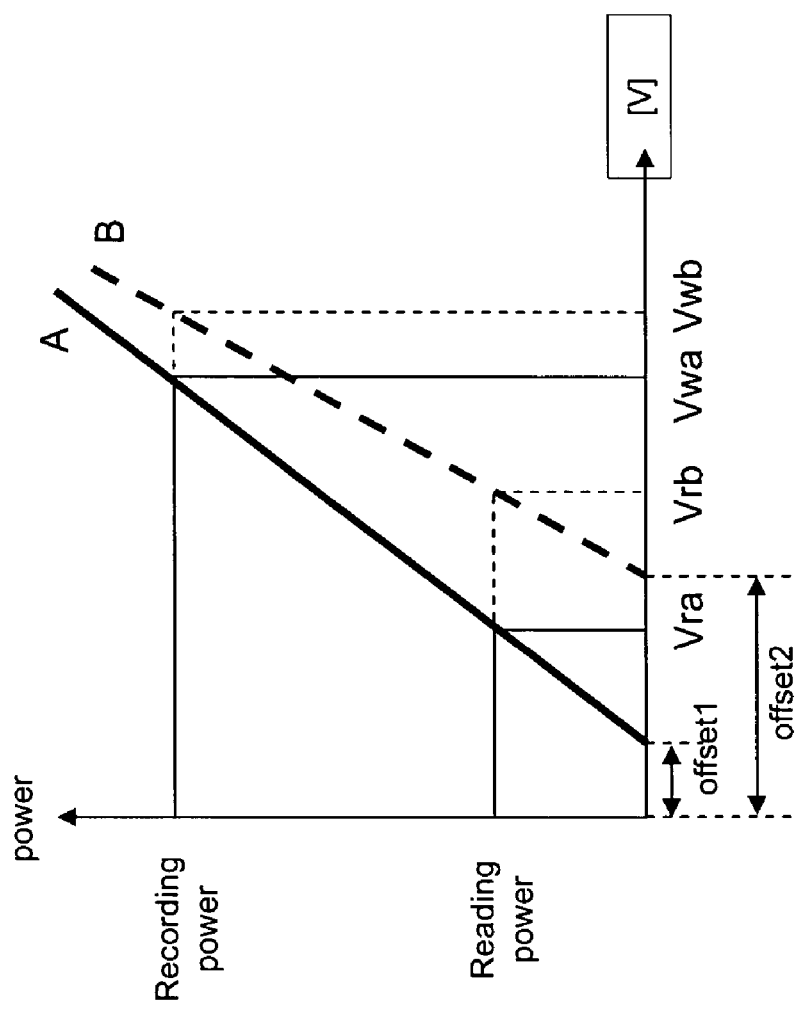
FIG. 4 illustrates how the characteristics of the light source vary over time.

FIG. 4 illustrates a plot of the characteristic slope and offset of the LD 2. Line A indicates the initial operating characteristics of the LD 2 and line B indicates operational characteristics of the LD 2 after a period of time has elapsed. As can be seen in FIG. 4, line A and line B have different offsets and slopes. Lines A and B may be defined by the two coordinates of the reading power Vra, Vrb and the recording power Vwa, Vwb, respectively.

Thus, the operator 7 may determine a current reading power Vr and a current recording power Vw from the current write signal WS output from the target power operation circuit 253. From these two values, the operator 7 may then extrapolate a corresponding compensation voltage Vc for each of the overlapping powers.

As shown in the embodiment of FIG. 3, when the operational characteristics change at all, i.e., due to temperature or other environmental factors, the overlapping portions may be corrected along with the read and write power. Alternatively, as discussed below in connection with FIGS. 5 and 6, the adjustment may only occur when the change exceeds a certain threshold.

Figure 5:
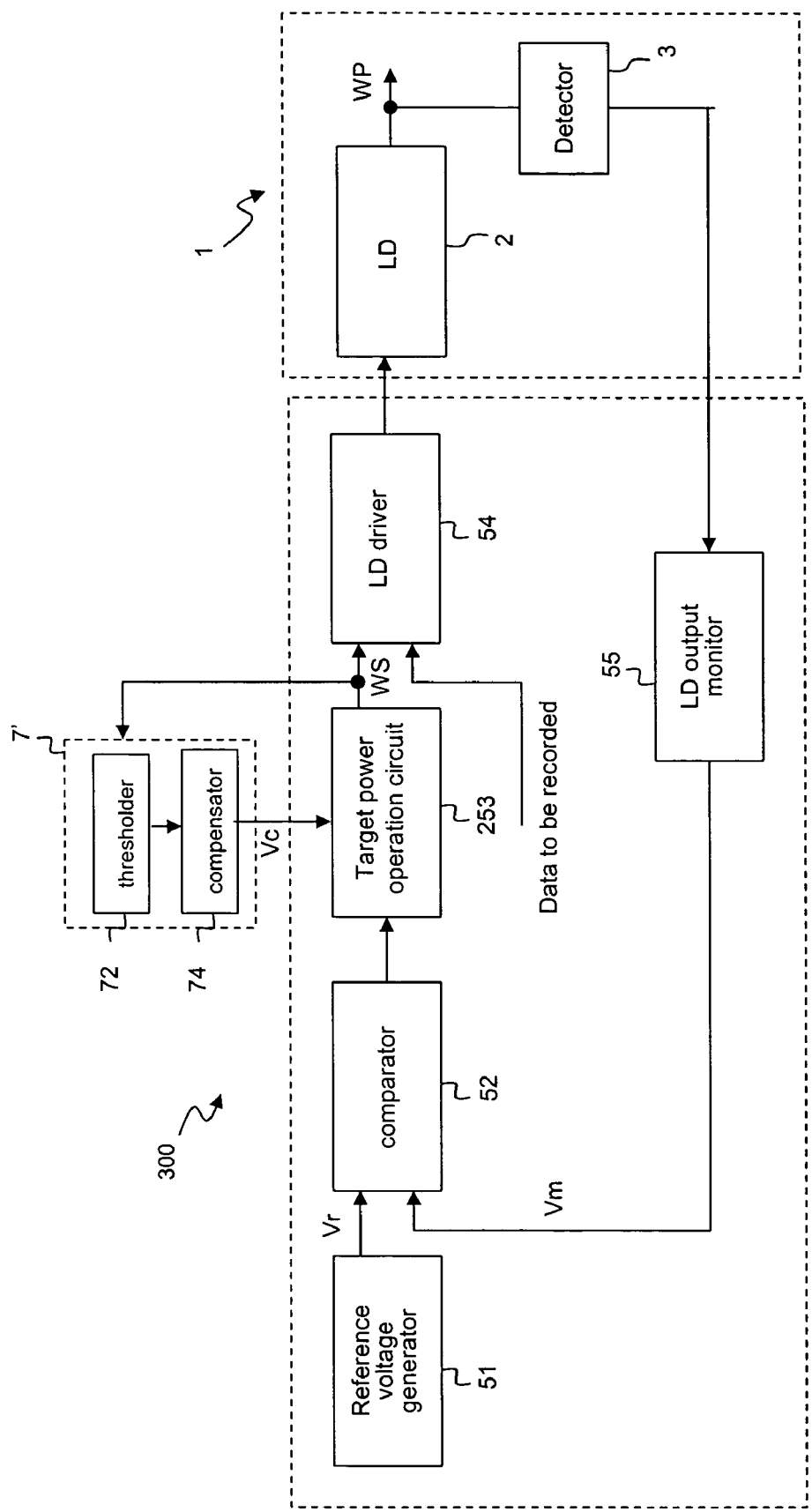
FIG. 5 illustrates a block diagram of an automatic light power controller in accordance with another embodiment of the present invention.

FIG. 5 illustrates another embodiment of an ALPC 300 of the present invention in which an operator 7' may include a comparator 72 and a compensator 74. The operator 7' may not automatically generate a compensation voltage Vc for the overlapping powers, but may only generate the compensation voltage Vc when the operational characteristics of the LD 2 have changed by more than a predetermined amount. The operation of all of the remaining elements is the same In particular, the thresholder 72 may store a previous reading power Vrp and a previous recording power Vwp, and compare that with the current reading voltage Vr and the current recording voltage Vw from the current write signal WS output from the target power operation circuit 253. If either of the previous voltages differ from the corresponding current voltage, then the compensator may extrapolate a corresponding compensation voltage Vc for each of the overlapping powers based on the current reading and writing voltages.

Figure 6:
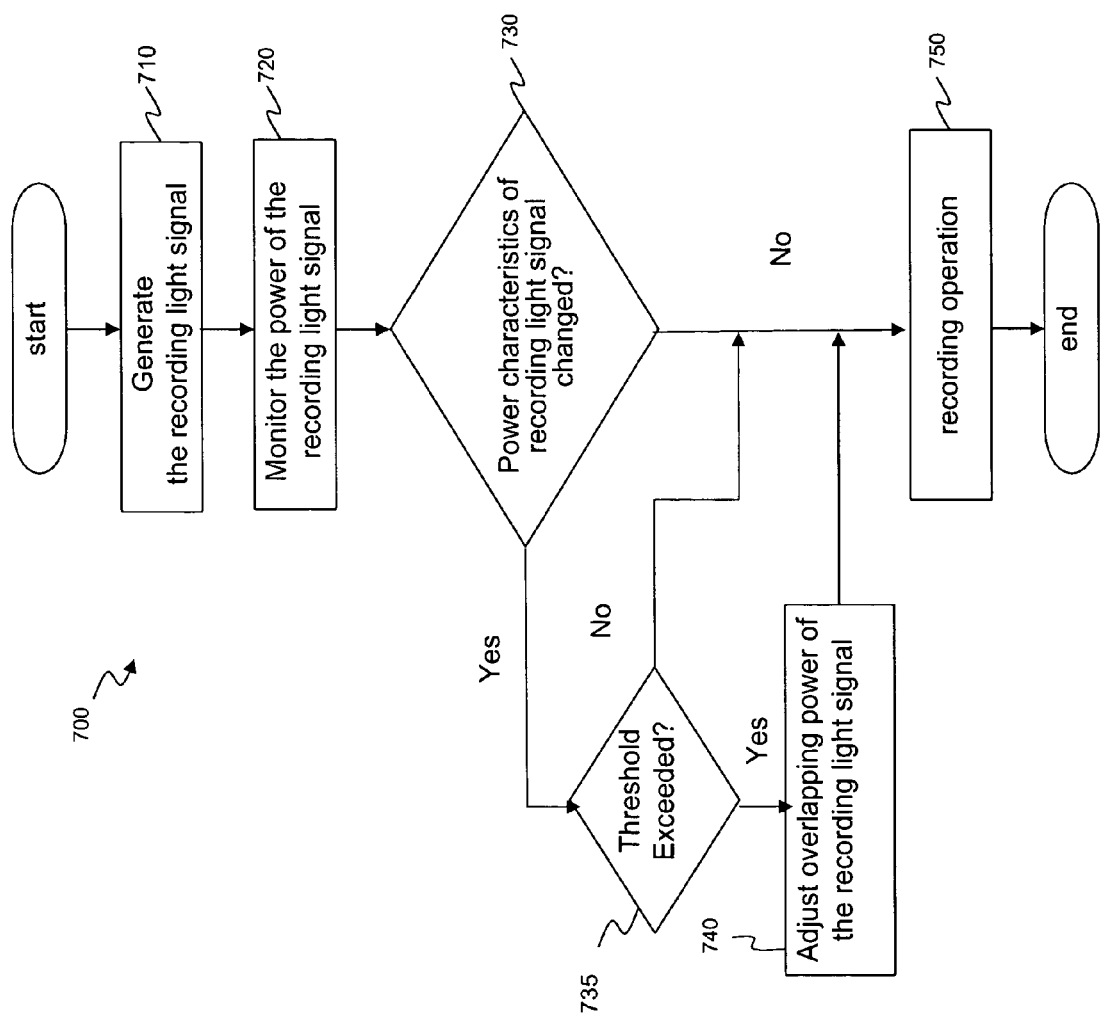
FIG. 6 illustrates a flow chart for controlling a recording light signal in accordance with an embodiment of the present invention.

FIG. 6 illustrates a flow chart of a method of controlling a light source in accordance with embodiments of the present invention. The light source outputs the recording light signal (710). The power of the recording light signal is monitored (720). The power characteristics of the light signal are monitored to determine if they vary from previous power characteristics (730). If they do not vary, the recording operation continues (750). If they do vary, it is determined whether a threshold has been exceeded (735) in accordance with the embodiment shown in FIG. 5. If not, the recording operation continues (750). If so, then overlapping power of the recording light signal is adjusted (740) and the recording operation continues (750). The checking (735) is optional, and may be omitted in accordance with the embodiment shown in FIG. 3, in which the method would proceed from determination of any change (730) to adjustment of the overlapping power (740).

Thus, in accordance with embodiments of the present invention, the overlapping powers, as well as the reading and recording powers, may be adjusted for optimal operation.

Exemplary embodiments of the present invention have been disclosed herein, and although specific terms are employed, they are used and are to be interpreted in a generic and descriptive sense only and not for purpose of limitation. While embodiments of the present invention have been described relative to a hardware implementation, the processing of present invention may be implemented in software, e.g., by an article of manufacture having a machine-accessible medium including data that, when accessed by a machine, cause the machine to determine a compensation voltage for the overlapping powers. Accordingly, it will be understood by those of ordinary skill in the art that various changes in form and details may be made without departing from the spirit and scope of the present invention as set forth in the following claims.

What is claimed is:

1. A method of controlling a light source for use with an optical disc having optimum power values for different stages in a writing signal for the optical disc, the method comprising:

determining current operational characteristics of the light source;

comparing the determined current operational characteristics of the light source to previous operational characteristics; and when the current operational characteristics differ from the previous operational characteristics, determining a compensation voltage based on the determined current operational characteristics and determining a current castle peak power for a castle peak stage based on the compensation voltage including maintaining a fixed relationship between the determined current operational characteristics and the current castle peak power equal to a fixed relationship between previous operational characteristics and a previous castle peak power.

2. The method as claimed in claim 1, wherein the determined current operational characteristics are detected during recording and reading stages.

3. The method as claimed in claim 1, wherein the determined current operational characteristics are measured during at least one of a record stage and a read stage.

4. The method as claimed in claim 1, further comprising determining whether the determined current operational characteristics differ from the previous operational characteristics by a predetermined amount and determining the compensation voltage only when a difference exceeds the predetermined amount.

5. An apparatus for controlling a light source for use with an optical disc having optimum power values for different stages in a writing signal for the optical disc, the apparatus comprising:

a light source characteristic monitor determining current operational characteristics of the light source;

a comparator for comparing the determined current operational characteristics of the light source to previous operational characteristics; and a compensator for determining, when the determined current operational characteristics differ from the previous operational characteristics, a compensation voltage based on the determined current operational characteristics and a current castle peak power value for a castle peak stage based on the compensation voltage, wherein the compensator determines the current castle peak power for the castle peak stage based on maintaining a fixed relationship between the determined current operational characteristics and the current castle peak power equal to a fixed relationship between previous operational characteristics and a previous castle peak power.

6. The apparatus as claimed in claim 5, wherein the determined current operational characteristics are measured recording and reading voltages.

7. The apparatus as claimed in claim 5, wherein the compensator outputs the compensation voltage to a target power operation circuit for controlling the light source, the target power operation circuit controls the light source in accordance with the compensation voltage.

8. The apparatus as claimed in claim 5, wherein the determined current operational characteristics are measured during at least one of a record stage and a read stage.

9. The apparatus as claimed in claim 5, further comprising a thresholder determining whether the determined current operational characteristics differ from the previous operational characteristics by a predetermined amount, the compensator determining the compensation voltage only when a difference exceeds the predetermined amount.

10. An apparatus for controlling a light source for use with an optical disc, comprising:

an operator receiving a write signal having different stages output to a driver for the light source, the operator determining whether measured current operational characteristics of the light source differs from previous operational characteristics, outputting a compensation voltage based on the measured current operational characteristics, and determining a current castle peak power for a castle peak stage based on the compensation voltage, wherein the compensation voltage maintains a fixed relationship between the measured current operational characteristics and the current castle peak power equal to a fixed relationship between previous operational characteristics and a previous castle peak power.

11. The apparatus as claimed in claim 10, wherein the operator further determines whether the measured current operational characteristics differ from the previous operational characteristics by a predetermined amount, and outputting the compensation voltage only when the predetermined amount is exceeded.

12. The apparatus as claimed in claim 10, wherein the measured current operational characteristics include a reading voltage and a writing voltage.

* * * * *